United States Patent [19]

Sherman, II et al.

[11] Patent Number: 4,560,368
[45] Date of Patent: Dec. 24, 1985

[54] SINGLE PIN UNIVERSAL JOINT

[75] Inventors: William E. Sherman, II, Granger, Ind.; Edgar A. Behrmann, Niles, Mich.

[73] Assignee: Allied Corporation, Morristown, N.J.

[21] Appl. No.: 645,981

[22] Filed: Aug. 31, 1984

[51] Int. Cl.⁴ .......................... F16D 3/26; F16D 3/24
[52] U.S. Cl. ................................... 464/112; 464/101; 464/147
[58] Field of Search ............... 464/106, 112, 128, 129, 464/147, 153, 84, 100, 101

[56] References Cited

U.S. PATENT DOCUMENTS

| | | | |
|---|---|---|---|
| 1,830,394 | 11/1931 | Glass | 464/106 |
| 1,988,967 | 1/1935 | Emrick | 464/112 X |
| 2,758,289 | 8/1956 | Schaber | 464/112 X |
| 2,997,864 | 8/1961 | Rueb | 464/112 |
| 3,106,076 | 10/1963 | Bastow | 64/17 |
| 4,075,871 | 2/1978 | Burke | 64/17 |
| 4,135,372 | 1/1979 | Benson | 464/112 X |

Primary Examiner—Stuart S. Levy
Assistant Examiner—Thomas R. Hannon
Attorney, Agent, or Firm—Larry J. Palguta; Ken C. Decker

[57] ABSTRACT

The universal joint (10) comprises a first shaft (12) having a head (14) with an annular cavity (16) therein in communication with an opening (18) in face (20) of head (14). A second shaft (30) has a pair of spaced arms (32) each terminating in an ear (34). The ears (34) are captured within the recesses (44) of a plastic cage member (40) mounted within cavity (16) by a pin (26). Resilient inserts (50) exert biasing force against the ears (34) to preload the universal joint (10) and eliminate free lash.

15 Claims, 4 Drawing Figures

U.S. Patent   Dec. 24, 1985   4,560,368
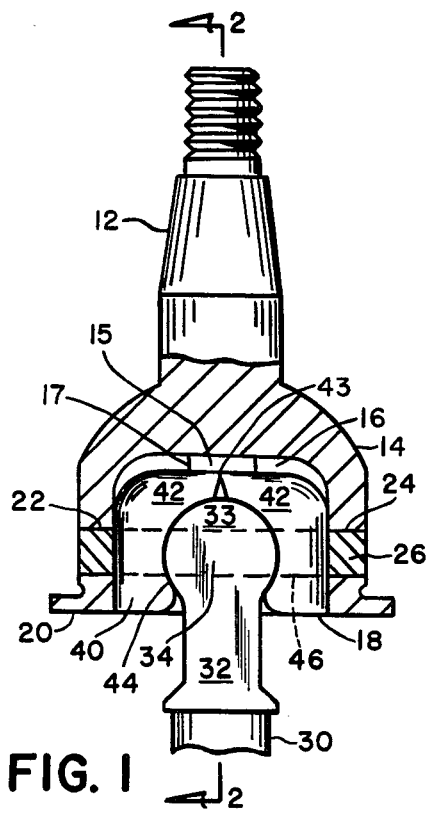
FIG. 1
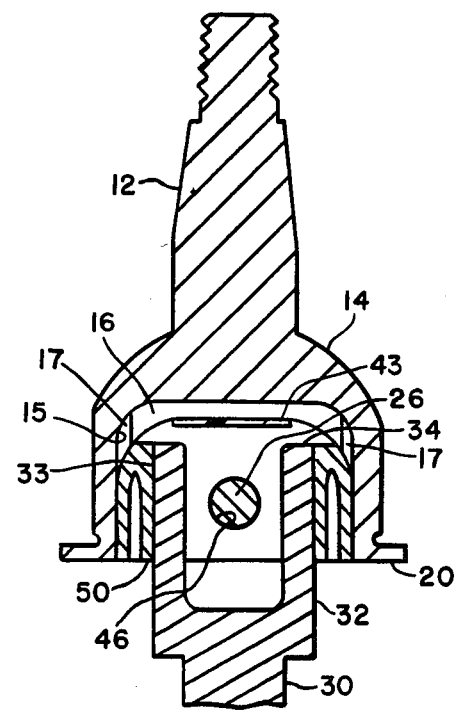
FIG. 2
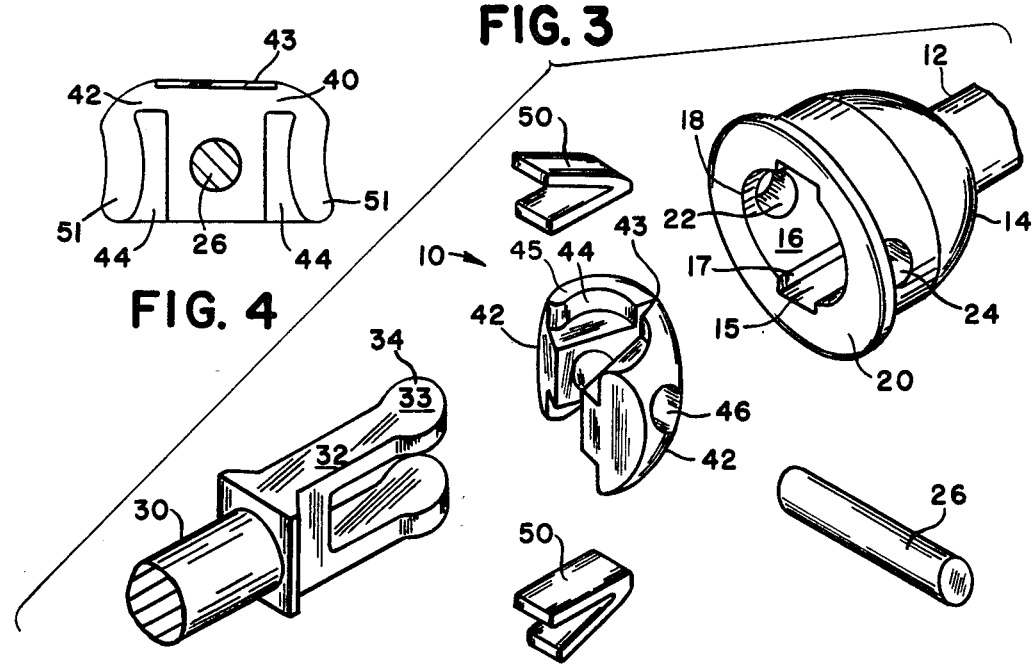
FIG. 3
FIG. 4

SINGLE PIN UNIVERSAL JOINT

This invention relates to a single pin universal joint, particularly for the steering column of a motor vehicle.

Universal joints have been designed for use in the steering column of a motor vehicle, in order that the steering column may be tilted or adjusted according to the desires of the vehicle driver. It has been found that the manufacture of many of the prior designs requires a significant number of component parts, numerous machining operations in the fabrication of the parts and assembly of the universal joint, and classification of parts during subassembly operations so that the parts, according to their dimensions, are properly matched-up with the other parts of the assembly. Therefore, it is desirable to produce a universal joint suitable for use within a steering column, and which eliminates or minimizes many of the problems inherent in prior universal joints.

The present invention comprises a single pin universal joint having a first shaft terminating in a hemispherical head having an internal cavity in communication with an opening at an end face of the hemispherically shaped head. The head has a pair of diametrically opposed through openings for receiving the ends of the single pin therein. A second shaft comprises a forked member having a pair of spaced arms each terminating in an annular ear. The annular shaped ears of the spaced arms are received within complementary shaped openings of a plastic cage member that is generally hemispherically shaped. The cage member may be split in two with the halves attached via an integral "living hinge" at one end thereof, or may be a single integral member. The plastic cage member is disposed about the spaced arms so that the annular ears of the arms are captured within the complementary shaped openings of the cage member, the cage member being received within the cavity of the hemispherical head. A single pin extends from one of the diametrically opposed openings of the hemispherical head to the other, passing through a passage in the cage member. The single pin member provides for rotation of the cage member and operatively coupled second shaft within one plane, while the engagement of the annular ear pieces of the arms with the complementary shaped openings of the cage member provides for rotation in another plane. Disposed between the annular ear pieces and the interior surface of the cavity are a pair of resilient members which provide resilient loading between the ears and the interior surface of the cavity. The resilient members may be either plastic members or insert molded metal pieces, and effectively provide a lash-free universal joint with a predetermined preloading.

The single pin universal joint provides many substantial advantages over prior universal joints. The single pin universal joint enables the maintenance of tight manufacturing tolerances with the use of standard manufacturing processes, significant dimensional and functional parameters are definable and measurable, the total number of parts is reduced, subassembly operations no longer require the classification of parts, the final assembly procedure is greatly simplified because adjustments are not necessary, and no lubrication is required for the universal joint. The universal joint has improved strength, and torsional loads applied to the annular ears are taken in the direction of greatest strength. Forces tending to bend the ears outwardly are minimized.

The invention is described in detail below with reference to the drawings which illustrate an embodiment, in which:

FIG. 1 is a cut-away view of the universal joint of the present invention;

FIG. 2 is a cross section view taken along view line 2—2 of FIG. 1;

FIG. 3 is an exploded view of the universal joint of the present invention; and

FIG. 4, is a section view of a plastic cage member having integral portions providing resilient means for loading the universal joint.

The single pin universal joint is designated generally by reference numeral 10. A first shaft 12 terminates in a hemispherical head 14 having a generally annular cavity 16 in communication with an opening 18 located at an end face 20. Hemispherical head 14 includes a pair of oppositely disposed through openings 22 and 24 provided for reception of the single pin 26.

Second shaft 30 is a forked member including a pair of rectangularly shaped spaced arms 32 each terminating in an annular ear 34. A plastic cage member 40 is generally hemispherical in shape and split into two identical halves 42 joined together by a living hinge at 43. The plastic cage member 40 may be split into the two halves 42 illustrated or may comprise a single integral part. Numerous plastic compositions are suitable for forming the cage 40, such as acetal or nylon resins. Plastic cage member 40 includes a pair of oppositely disposed annular recesses 44 shaped complementary to annular ears 34. Recesses 44 include the proper depth dimension so that each ear 34 is captured within a recess 44 whereby ears 34 are disposed inwardly of the outer surface 45 of hemispherical cage 40. In other words, after an ear 34 is received within an associated recess 44, the upper surface 33 is located radially inwardly of the plastic cage 40. Plastic cage 40 includes through passage 46 for reception of the single pin 26. Through passage 46 may be sized slightly smaller than pin 26 so that when pin 126 is forced through the passage, there is created a press fit which provides a preloading of the universal joint 10. Finally, resilient means or inserts 50 are located within recesses 44 and in engagement with an associated ear piece 34. The resilient inserts may take the form of any resilient means for providing a preload to the universal joint to eliminate free lash, such as plastic, metal, or any other suitable material providing the appropriate loading of the joint. The resilient inserts may be either insert molded as part of the plastic cage 40 or comprise separate components assembled with the universal joint. The inserts illustrated in FIG. 3 are positioned in cavity 16 by means of slots 17. Alternatively, resilient means 50 may comprise integral portions 51 of the plastic cage 40 (see FIG. 4), thereby eliminating two parts in the assembly of universal joint 10.

Annular ears 34 are captured within the complementary shaped recesses 44, and pin 26 is press fitted through passage 40 so that the ends of pin 26 are received within the through openings 22 and 24. The ends of pin 26 are fixed or secured to hemispherical head 14, whereby plastic cage 40 is maintained within cavity 16. This provides for rotation of shaft 30 about pin 26, and shaft 30 also may be rotated about annular ears 34 as recesses 44 capture and maintain ears 34 within the cavity of hemispherical head 14.

Assembly of universal joint 10 is accomplished by placing plastic cage 40 over second shaft 30 to capture ears 34 within the respective recesses 44. If resilient means or inserts 50 are insert molded in plastic cage 40 or comprise integral portions 51 of cage 50, ears 34 are merely force fitted within the respective recesses which deform slightly to receive therein the ears. However, if the resilient inserts are components separate from plastic cage 40, after the ears 34 have been received within respective recesses 44, the resilient inserts 50 are placed within the respective recesses 44 so that they engage surfaces 33 of arms 32. The subassembly of second shaft 30, plastic cage 40, and resilient inserts 50 is then inserted within annular cavity 16 of hemispherical head 14. Pin 26 is press fitted through opening 22, passage 46, and the end received in the other opening 24. The ends of pin 26 are then fixed or secured to the hemispherical head by any one of several methods well known in the art.

The assembled single pin universal joint 10 comprises a second shaft 30 which may rotate about the single pin secured to hemispherical head 14, and also may rotate about ears 34 captured within recesses 44. The structure of plastic cage 40 is more than sufficiently strong to capture ears 34 and prevent axial displacement of second shaft 30 relative to first shaft 12. Likewise, resilient inserts 50 engage the interior surface 15 of slots 17 to provide resilient loading between surface 15 and ears 34 of second shaft 30. This resilient loading eliminates lash within universal joint 10, and the loading force effected may be controllably altered in accordance with the particular design and functional requirements.

The present invention provides a universal joint which may be manufactured in accordance with tight manufacturing tolerances that are producable by standard manufacturing processes, and the dimensional characteristics are easily definable and measurable. The total number of parts in the universal joint is significantly reduced, the number of machining operations minimized, there is no longer a need to classify the parts of the subassemblies in order to have the various parts "match up" with other parts that vary in their dimensions and tolerances, and the final assembly provides a simplified and easily manufacturable universal joint. No adjustments are necessary because the loading required to eliminate lash and provide a strong universal joint is easily produced during the assembly procedure. Additionally, no lubrication is required, and the hemispherical head of the first shaft does not require a longitudinal slot in order for the arms of the second shaft to be inserted within the cavity. Torsional loads applied to the ears of the arms are received and taken in the direction of greatest strength, and any forces tending to bend the ears outwardly are minimized. Thus, the single pin universal joint of the present invention provides a greatly simplified structure which is easily and inexpensively manufactured, with highly predictable and controllable functional and structural characteristics.

Although this invention has been described in connection with the illustrated embodiment, it will be obvious to those skilled in the art that various changes may be made in the form, structure, and arrangement of parts without departing from the invention.

We claim:

1. A universal joint comprising first and second rotatable members capable of being rotated with their axes angularly disposed with respect to one another, the first rotatable member including a head having an opening communicating with an interior cavity, the second rotatable member having a pair of spaced arms located at an end and each spaced arm including an ear, a cage member made of plastic material and disposed within the interior cavity, the cage member having a pair of complementary shaped openings capturing said ears such that said second rotatable member can rotate about said ears in a plane relative to said cage member, retaining means extending between diametrically opposed portions of said cavity and extending into said cage member and between the ears of said second rotatable member to permit rotation of said cage member, and resilient means disposed between said arms and adjacent surface of the cavity to provide resilient loading for the joint, the cage member comprising a plastic member including two sections connected by a living hinge, the cage member disposed about said ears by pivoting said sections about the living hinge to capture the ears within the openings of the cage member, the ears being maintained within said complementary shaped openings of the cage member to provide lash free movement of the joint in any direction of movement.

2. The universal joint in accordance with claim 1, wherein the complementary shaped openings and ears are generally circular shaped to maintain the ears therein for rotational movement.

3. The universal joint in accordance with claim 1, wherein said resilient means comprises resilient members fixedly disposed within the cage member.

4. The universal joint in accordance with claim 1, further comprising holes disposed in said opposed portions, said holes receiving the retaining means therein for anchoring the retaining means relative to the head.

5. The universal joint in accordance with claim 4, wherein said retaining means comprises a pin providing an axis for rotation of said cage member relative to said head.

6. The universal joint in accordance with claim 1, wherein said head comprises a hemispherically shaped member having the interior cavity therein, the cage member and ears of the second rotatable member positioned within said interior cavity by means of the retaining means.

7. The universal joint in accordance with claim 1, wherein said resilient means comprises resilient members disposed within said complementary shaped openings in said cage member, the resilient means providing loading between the rotatable members.

8. The universal joint in accordance with claim 1, wherein the complementary shaped openings of said cage member encompass said ears such that said ears are captured within said openings to prevent axial displacement of said second rotatable member relative to the one rotatable member.

9. The universal joint in accordance with claim 1, wherein the resilient means comprises integral portions of said cage member, the portions providing loading between the two rotatable members.

10. A universal joint comprising first and second rotatable members capable of being rotated with their axes angularly disposed with respect to one another, the first rotatable member including a head having an opening communicating with an interior cavity, the second rotatable member having an end, and locating means between said end and said cavity for locating said end in said cavity, characterized in that said end comprises two spaced arms each including an ear, the locating means comprising a cage member made of plastic material and having a pair of complementary shaped openings capturing therein said ears so that the second rotatable member can rotate about the ears in a plane relative to the cage member and retaining means extending between portions of the cavity to extend into said cage member and between the ears of the second rotatable member, the cage member comprising a plastic member including two sections connected by a living hinge, the cage member disposed about said ears by pivoting said sections about the living hinge to capture the ears within the openings of the cage member, and resilient means positioned between surfaces of said cavity and said ears to provide for lash-free movement of the rotatable members.

11. The universal joint in accordance with claim 10, wherein the complementary shaped openings and ears are generally circular shaped to maintain the ears therein for rotational movement.

12. The universal joint in accordance with claim 10, wherein the retaining means comprises a pin providing an axis for rotation of said cage member relative to said head.

13. The universal joint in accordance with claim 10, wherein the resilient means comprises resilient members fixedly disposed within the cage member.

14. The universal joint in accordance with claim 10, wherein said resilient means comprises resilient members disposed within said complementary shaped openings in said cage member, the resilient means providing preloading between the two rotatable members.

15. The universal joint in accordance with claim 10, wherein said resilient means comprises integral portions of said cage member, the portions providing loading between the rotatable members.

* * * * *